US008717638B2

(12) United States Patent
Mizoguchi

(10) Patent No.: US 8,717,638 B2
(45) Date of Patent: May 6, 2014

(54) OPTICAL SCANNER HAVING MULTI SHAFT LINK SECTIONS, IMAGE FORMING APPARATUS

(75) Inventor: Yasushi Mizoguchi, Suwa (JP)

(73) Assignee: Seiko Epson Corporation (JP)

(*) Notice: Subject to any disclaimer, the term of this patent is extended or adjusted under 35 U.S.C. 154(b) by 604 days.

(21) Appl. No.: 13/024,367

(22) Filed: Feb. 10, 2011

(65) Prior Publication Data
US 2011/0205602 A1  Aug. 25, 2011

(30) Foreign Application Priority Data

Feb. 23, 2010 (JP) ................................. 2010-037996

(51) Int. Cl.
H04N 1/04 (2006.01)
G02B 26/10 (2006.01)

(52) U.S. Cl.
USPC ..... 358/475; 358/474; 359/198.1; 359/199.4; 359/200.6; 359/200.7; 359/200.8; 359/202.1; 359/221.2; 359/223.1; 359/226.2; 359/904; 347/255; 347/256; 347/257; 347/258; 347/259; 347/260

(58) Field of Classification Search
None
See application file for complete search history.

(56) References Cited

U.S. PATENT DOCUMENTS

| 4,302,709 A | 11/1981 | Tichtinsky |
| 5,529,277 A | 6/1996 | Ostaszewski |
| 5,912,608 A | 6/1999 | Asada |
| 5,999,303 A | 12/1999 | Drake |
| 6,359,718 B1 | 3/2002 | Lin et al. |
| 6,501,588 B1 | 12/2002 | Rosa et al. |
| 6,681,063 B1 | 1/2004 | Kane et al. |
| 6,806,991 B1 | 10/2004 | Sarkar et al. |
| 6,817,725 B2 | 11/2004 | Mizuno et al. |
| 6,876,124 B1 | 4/2005 | Lin et al. |
| 7,295,726 B1 | 11/2007 | Milanovic et al. |
| 7,428,353 B1 | 9/2008 | Milanovic et al. |
| 7,554,711 B2 | 6/2009 | Miles |
| 7,605,965 B2 | 10/2009 | Tani et al. |
| 7,667,868 B2 | 2/2010 | Hayashi et al. |
| 7,813,021 B2 | 10/2010 | Akatsu |
| 7,832,880 B2 | 11/2010 | Craig |
| 7,872,394 B1* | 1/2011 | Gritters et al. ............... 310/309 |
| 8,148,874 B2 | 4/2012 | Xie et al. |
| 2002/0001118 A1 | 1/2002 | Nakajima et al. |
| 2008/0061026 A1 | 3/2008 | Milanovic et al. |
| 2009/0261688 A1* | 10/2009 | Xie et al. ..................... 310/307 |
| 2011/0181933 A1* | 7/2011 | Kubo et al. ............... 359/224.1 |
| 2011/0205608 A1 | 8/2011 | Mizoguchi |

FOREIGN PATENT DOCUMENTS

| JP | 8322227 A | 3/1996 |
| JP | 2005-181395 | 7/2005 |

* cited by examiner

Primary Examiner — Miya J Cato
(74) Attorney, Agent, or Firm — Harness, Dickey & Pierce, P.L.C.

(57) ABSTRACT

An optical scanner includes: a light reflecting section having light reflectivity; a movable section which includes the light reflecting section and can be displaced; two link sections connected to positions of ends of the movable section, the positions facing each other; a supporting section supporting the link sections; and a displacement providing section turning the two link sections, wherein each link section includes a turnable drive section, and a shaft section connecting the movable section and the drive section and bending in a thickness direction of the movable section by turning of the drive section.

16 Claims, 13 Drawing Sheets

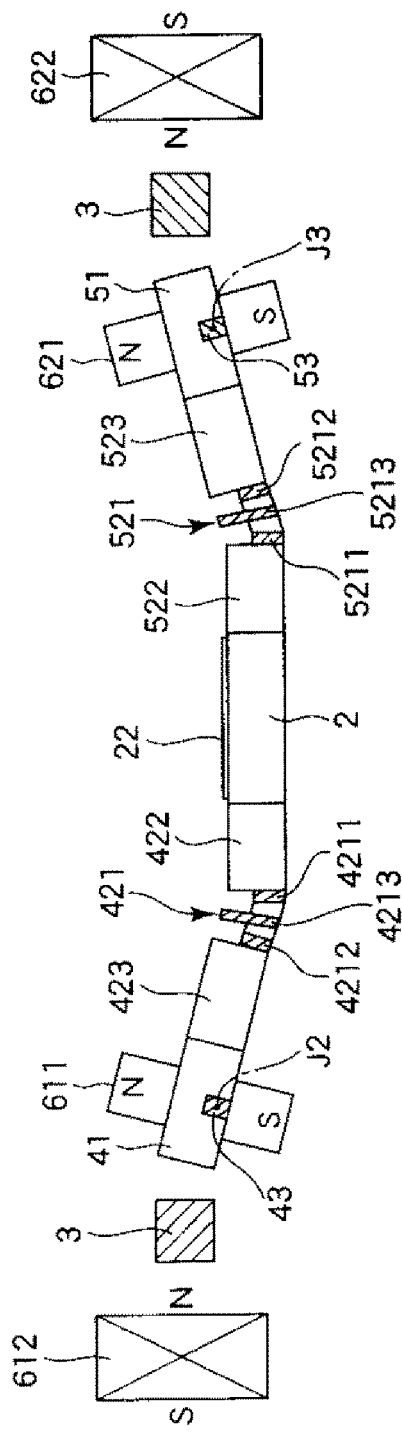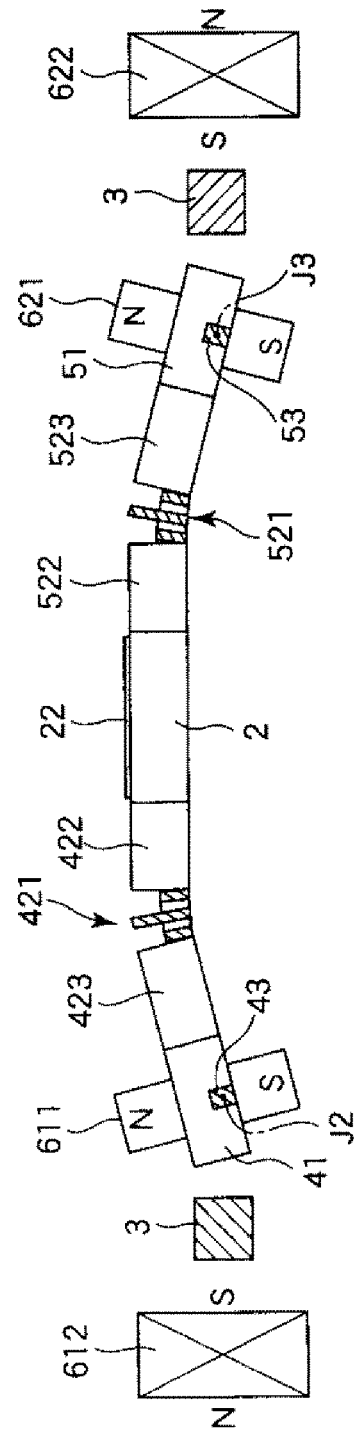
FIG. 9A
FIG. 9B

OPTICAL SCANNER HAVING MULTI SHAFT LINK SECTIONS, IMAGE FORMING APPARATUS

BACKGROUND

1. Technical Field

The present invention relates to optical scanners and image forming apparatuses.

2. Related Art

For example, as an optical scanner for performing drawing by optical scanning in a laser printer or the like, an optical scanner formed of a torsion oscillator has been known (see, for example, JP-A-2005-181395 (Patent Document 1)).

Patent Document 1 discloses an optical scanner (a light polarizing device) having a frame-shaped supporting substrate, a scan mirror provided inside the supporting substrate, a pair of torsion bars provided coaxially and connecting the supporting substrate and the scan mirror, a permanent magnet provided in the scan mirror, and a coil generating a magnetic field acting on the permanent magnet. The optical scanner of Patent Document 1 is so configured as to turn the scan mirror about a central axis while torsionally deforming the pair of torsion bars by applying an alternating voltage to the coil and thereby alternately changing poles of the magnetic field acting on the permanent magnet.

However, although the optical scanner of Patent Document 1 can turn the scan mirror about the central axis, it cannot displace (move) the central axis. Specifically, the optical scanner of Patent Document 1 cannot move the central axis of the scan mirror arbitrarily in a direction of the thickness of the scan mirror (in a non-driven state) because of the structure of the optical scanner. Moreover, for example, in a state in which the scan mirror is not turned, the optical scanner of Patent Document 1 also cannot displace the scan mirror in the thickness direction thereof while keeping the position thereof. That is, the optical scanner of Patent Document 1 has only one scan mirror driving pattern of turning the scan mirror about a turn central axis fixed to one point. This makes the optical scanner less convenient.

SUMMARY

An advantage of some aspects of the invention is to provide an optical scanner and an image forming apparatus which can be driven in a plurality of driven patterns and are highly convenient.

An optical scanner according to an aspect of the invention is an optical scanner including: a movable section including a light reflecting section having light reflectivity; a supporting section supporting the movable section; two link sections provided on both sides of the movable section and connecting the movable section and the supporting section; and a displacement providing section displacing the movable section, wherein each link section has a drive section which is turnable with respect to the supporting section and a shaft section connecting the drive section and the movable section, the shaft section of each link section can bend in a thickness direction of the movable section in a midpoint of the shaft section in a longitudinal direction, and the movable section is displaced by making the displacement providing section turn the drive section of each link section and bend the shaft section by the turning.

This makes it possible to provide an optical scanner which can be driven in a plurality of driven patterns and is highly convenient.

In the optical scanner according to the aspect of the invention, when two axes which are at right angles to one another in a plan view of the movable section are an X axis and a Y axis, it is preferable that each of the two link sections have the drive section placed so as to be away from the movable section in an X-axis direction, a first shaft section which is the shaft section connecting the movable section and the drive section and extending in the X-axis direction, and a second shaft section connecting the drive section and the supporting section and extending in a Y-axis direction, and the first shaft section be bent by making the displacement providing section turn the drive section about the Y axis while torsionally deforming the second shaft section.

This simplifies the structure of the link section.

In the optical scanner according to the aspect of the invention, it is preferable that the first shaft section of each link section have a node section provided at a midpoint in an extending direction, a movable section's-side shaft section connecting the node section and the movable section, and a drive section's-side shaft section connecting the node section and the drive section, and bend at the node section.

This makes it possible to bend the first shaft section easily.

In the optical scanner according to the aspect of the invention, it is preferable that the first shaft section of each link section can cause a first deformation by which the first shaft section bends at the node section so as to be deformed into the shape of a letter V projecting toward one side in the thickness direction of the movable section and a second deformation by which the first shaft section bends at the node section so as to be deformed into the shape of a letter V projecting toward the other side in the thickness direction of the movable section.

By bending each first shaft section in the manner described above, it is possible to displace the movable section efficiently.

In the optical scanner according to the aspect of the invention, it is preferable that the movable section be turned about the Y axis by making the displacement providing section alternately repeat a state in which one of the first shaft sections of the link sections causes the first deformation and the other first shaft section causes the second deformation and a state in which the one of the first shaft sections causes the second deformation and the other first shaft section causes the first deformation.

This makes it possible to turn the movable section smoothly.

In the optical scanner according to the aspect of the invention, it is preferable that the movable section be vibrated in the thickness direction of the movable section by making the displacement providing section alternately repeat a state in which the first shaft sections of the link sections cause the first deformation and a state in which the first shaft sections of the link sections cause the second deformation.

This makes it possible to vibrate the movable section smoothly.

In the optical scanner according to the aspect of the invention, it is preferable that the node section of each link section have a torsional deformation section which is torsionally deformed about the Y axis.

As a result of the torsional deformation section being torsionally deformed when the first shaft section bends, it is possible to alleviate effectively the stress produced by bending.

In the optical scanner according to the aspect of the invention, it is preferable that the node section of each link section have a pair of torsional deformation sections, and one of the pair of torsional deformation sections be connected to the movable section's-side shaft section, and the other torsional deformation section be connected to the drive section's-side shaft section.

As a result of the torsional deformation section being torsionally deformed when the first shaft section bends, it is possible to alleviate effectively the stress produced by bending.

In the optical scanner according to the aspect of the invention, it is preferable that the node section of each link section be provided between the pair of torsional deformation sections, and have a nondeformed section which extends in the Y-axis direction and is not torsionally deformed about the Y axis.

As a result, it is possible to bend the first shaft section at the nondeformed section locally. This makes it possible to bend the first shaft section with ease and reliability and displace (turn) the movable section with stability.

In the optical scanner according to the aspect of the invention, it is preferable that the movable section's-side shaft section and the drive section's-side shaft section of each link section be not virtually deformed.

As a result, it is possible to bend the first shaft section at the node section with ease. This makes it possible to displace (turn) the movable section with stability.

In the optical scanner according to the aspect of the invention, it is preferable that each link section be formed of a SOI substrate in which a first Si layer, a $SiO_2$ layer, and a second Si layer are laid one on top of another in this order.

This makes it possible to form each link section with ease.

In the optical scanner according to the aspect of the invention, it is preferable that the movable section's-side shaft section, the nondeformed section, the drive section's-side shaft section, and the drive section of each link section be each formed of the first Si layer, the $SiO_2$ layer, and the second Si layer, and the torsional deformation section and the second shaft section be each formed of the second Si layer.

This makes it possible to form each link section with ease.

In the optical scanner according to the aspect of the invention, it is preferable that a pair of displacement providing sections be provided for the two link sections, and each displacement providing section have a permanent magnet provided in the drive section and a coil producing a magnetic field acting on the permanent magnet.

This simplifies the structure of the displacement providing section.

In the optical scanner according to the aspect of the invention, it is preferable that, in each displacement providing section, the permanent magnet be provided in such a way that both poles face each other in the thickness direction of the movable section, and the coil be provided in such a way as to produce a magnetic field in the X-axis direction.

This makes it possible to displace the movable section with stability.

In the optical scanner according to the aspect of the invention, it is preferable that, in each displacement providing section, the permanent magnet be provided so as to penetrate the drive section.

This makes it possible to displace the movable section with stability.

An image forming apparatus according to another aspect of the invention includes an optical scanner having a movable section including a light reflecting section having light reflectivity, a supporting section supporting the movable section, two link sections provided on both sides of the movable section and connecting the movable section and the supporting section, and a displacement providing section displacing the movable section, wherein each link section has a drive section which is turnable with respect to the supporting section and a shaft section connecting the drive section and the movable section, the shaft section of each link section can bend in a thickness direction of the movable section in a midpoint of the shaft section in a longitudinal direction, and the movable section is displaced by making the displacement providing section turn the drive section of each link section and bend the shaft section by the turning.

This makes it possible to provide an image forming apparatus which can be driven in a plurality of driven patterns and is highly convenient.

BRIEF DESCRIPTION OF THE DRAWINGS

The invention will be described with reference to the accompanying drawings, wherein like numbers reference like elements.

FIGS. 9A and 9B are diagrams explaining the driving of the optical scanner shown in FIG. 1.

DESCRIPTION OF EXEMPLARY EMBODIMENTS

Hereinafter, preferred embodiments of an optical scanner and an image forming apparatus of the invention will be described with reference to the accompanying drawings.

First Embodiment

First, a first embodiment of the optical scanner of the invention will be described.

Figure 1:
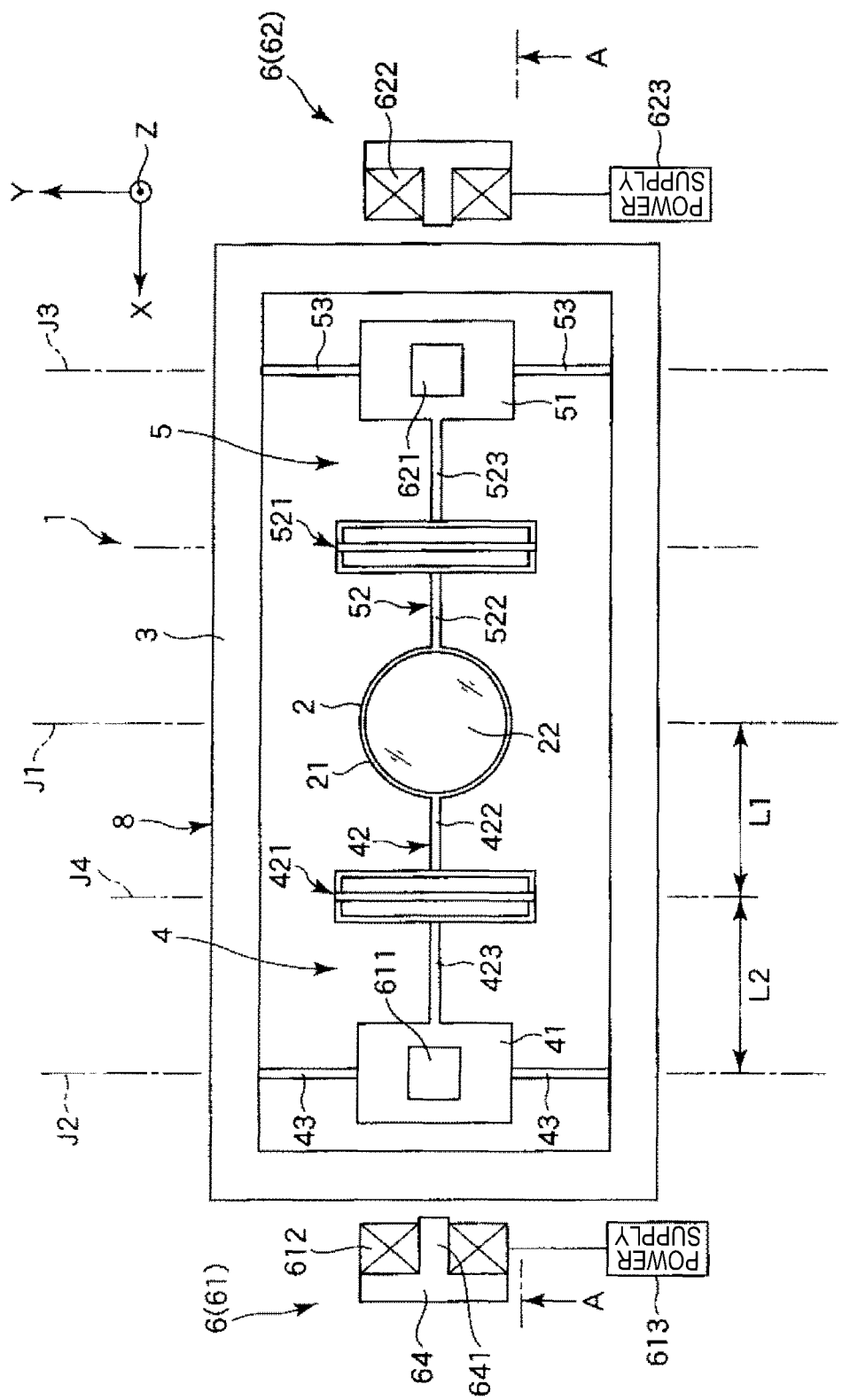
FIG. 1 is a plan view showing a first embodiment of an optical scanner according to the invention.
Figure 2:
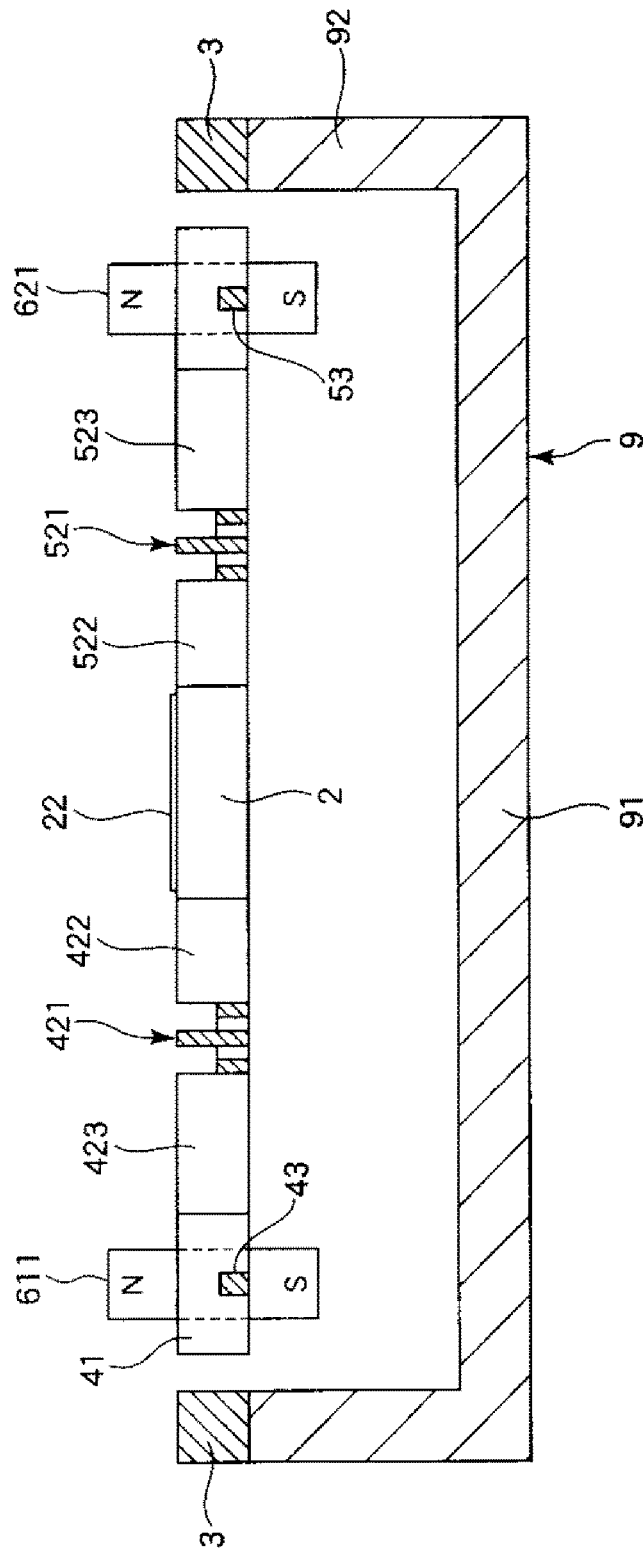
FIG. 2 is a sectional view (a sectional view taken on the line A-A in FIG. 1) of the optical scanner shown in FIG. 1.
Figure 3:
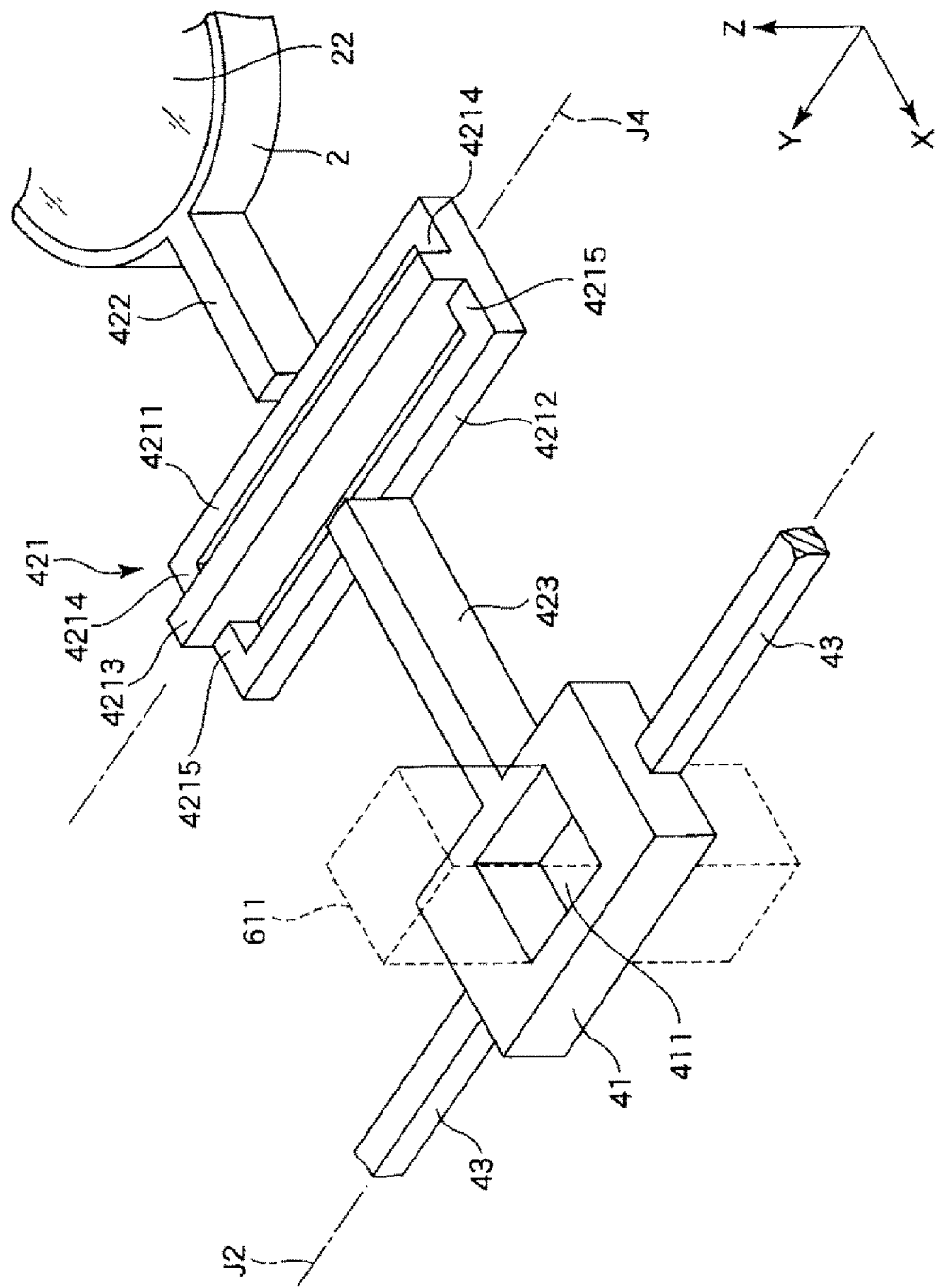
FIG. 3 is a perspective view of a link section of the optical scanner shown in FIG. 1.
Figure 4A:
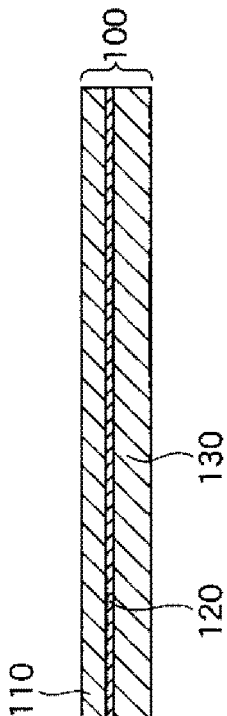
FIGS. 4A to 4C are sectional views explaining a method for producing a vibration system of the optical scanner shown in FIG. 1.
Figure 4B:
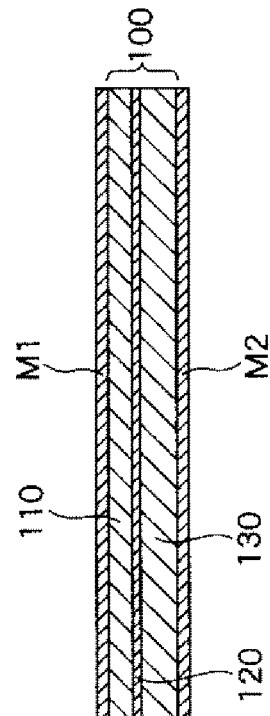
Figure 4C:
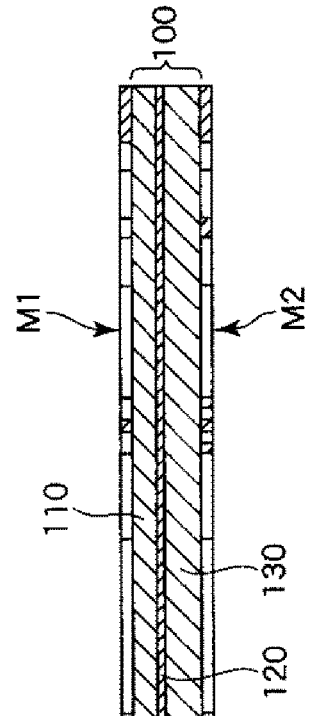
Figure 5A:
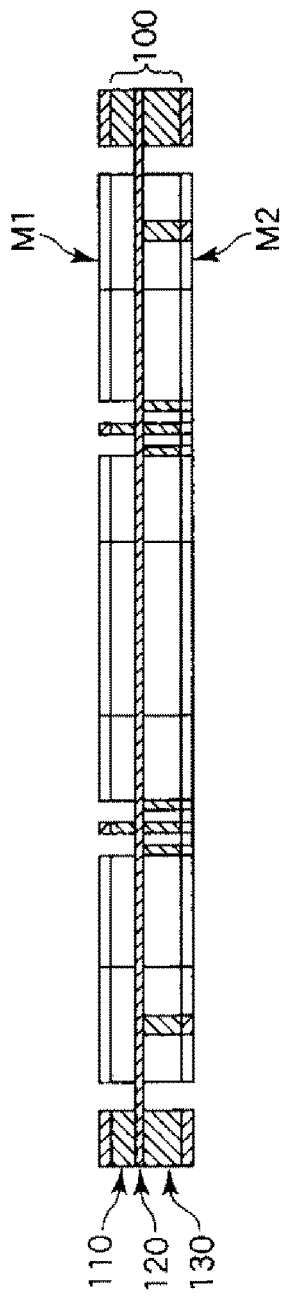
FIGS. 5A to 5C are sectional views explaining the method for producing the vibration system of the optical scanner shown in FIG. 1.
Figure 5B:
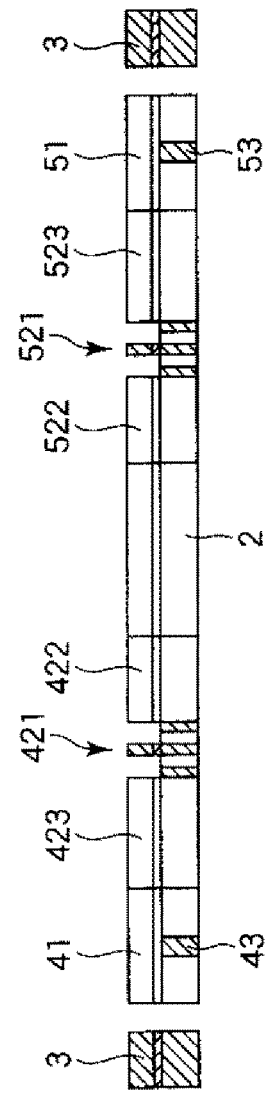
Figure 5C:
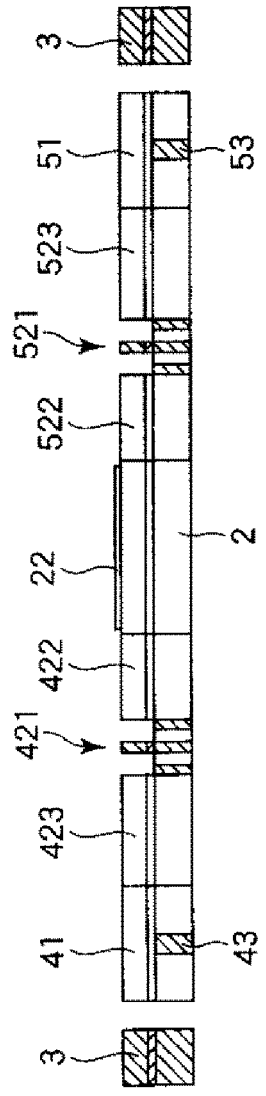
Figure 6:
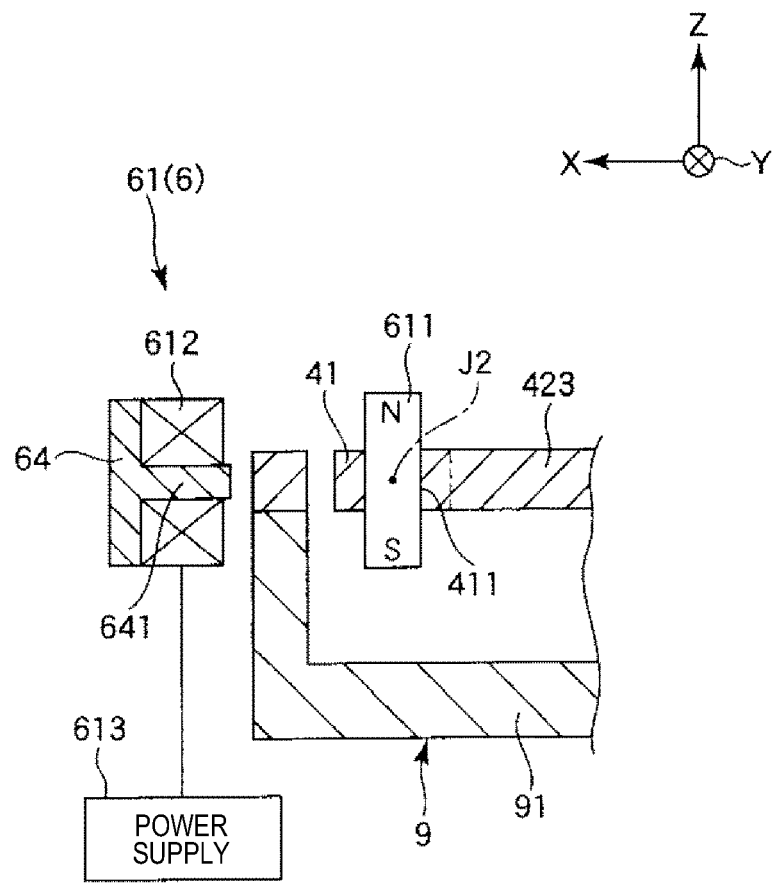
FIG. 6 is a diagram explaining a displacement unit of the optical scanner shown in FIG. 1.

FIG. 1 is a plan view showing the first embodiment of the optical scanner of the invention, FIG. 2 is a sectional view (a sectional view taken on the line A-A in FIG. 1) of the optical scanner shown in FIG. 1, FIG. 3 is a perspective view of a link section of the optical scanner shown in FIG. 1, FIGS. 4A to 4C and FIGS. 5A to 5C are sectional views explaining a method for producing a vibration system of the optical scanner shown in FIG. 1, FIG. 6 is a diagram explaining a displacement unit (a displacement providing section) of the optical scanner shown in FIG. 1, and FIGS. 7A and 7B, FIG. 8, and FIGS. 9A and 9B are diagrams explaining the driving of the optical scanner shown in FIG. 1.

Incidentally, in the following description, for convenience of explanation, left and right sides in FIG. 1 are referred to as "left" and "right", respectively, and upper and lower sides in FIGS. 2 to 9 are referred to as "upper" and "lower", respectively. Moreover, three axes which are at right angles to one another as shown in FIG. 1 are an X axis, a Y axis, and a Z axis, a plane of a movable plate (a movable section) in a non-driven state is coincident with (is parallel to) a plane formed of the X axis and the Y axis, and a thickness direction of the movable plate is coincident with the Z axis. Furthermore, hereinafter, a direction parallel to the X axis is referred to as an "X-axis direction", a direction parallel to the Y axis is referred to as a "Y-axis direction", and a direction parallel to the Z-axis is referred to as a "Z-axis direction".

An optical scanner 1 shown in FIGS. 1 and 2 includes a vibration system 8 formed of a movable plate 2, a supporting section 3 supporting the movable plate 2, and a pair of link sections 4 and 5 connecting the movable plate 2 and the supporting section 3, a pedestal 9 supporting the vibration system 8, and a displacement unit 6 displacing the movable plate 2.

Incidentally, in the optical scanner 1, as a displacement of the movable plate 2, broadly, a pattern can be selected from a pattern in which the movable plate 2 turns about a turn central axis J1 shown in FIG. 1, a pattern in which the movable plate 2 vibrates in the Z-axis direction while keeping the position thereof, and a pattern in which the movable plate 2 comes to rest in a position which is not the position thereof in a natural state. However, in the following description, unless otherwise specified, the "displacement" of the movable plate 2 includes these three patterns.

Hereinafter, components of the optical scanner 1 will be sequentially described in detail.

1-1. Vibration System 8

In this embodiment, the vibration system 8 (that is, the movable plate 2, the supporting section 3, and the pair of link sections 4 and 5) is integrally formed by removing an unnecessary part of a SOI substrate by various etching methods such as dry etching and wet etching. Incidentally, a method for producing the vibration system 8 will be described later in detail.

The supporting section 3 has the function of supporting the movable plate 2. Such a supporting section 3 is shaped like a frame, and is provided so as to surround the movable plate 2. Incidentally, the shape of the supporting section 3 is not limited to a particular shape as long as the supporting section 3 can support the movable plate 2. For example, a pair of supporting sections 3 may be provided in such a way that the supporting sections 3 face each other in the X-axis direction or the Y-axis direction with the movable plate 2 placed between the supporting sections 3.

Inside the supporting section 3, the movable plate 2 is provided. The movable plate 2 is shaped like a flat plate, and has a light reflecting section 22 formed on one surface (a surface facing away from the pedestal 9) 21 thereof, the light reflecting section 22 having light reflectivity. The light reflecting section 22 is obtained by forming, for example, a metal film such as gold, silver, or aluminum on the surface 21 by vapor deposition or the like.

Incidentally, in this embodiment, the planar shape of the movable plate 2 is a circle. However, the planar shape of the movable plate 2 is not limited to a particular shape, and may be, for example, a rectangle, a polygon such as a square, or an oval.

Such a movable plate 2 is connected to the supporting section 3 by the link sections 4 and 5. The link sections 4 and 5 are placed in opposite positions with respect to the movable plate 2, and support the movable plate 2 by holding the movable plate 2 from both sides. Specifically, the link section 4 connects the movable plate 2 and the supporting section 3 in the left side in FIG. 1, and the link section 5 connects the movable plate 2 and the supporting section 3 in the right side in FIG. 1. Such link sections 4 and 5 are formed so as to be symmetric with respect to the movable plate 2 (the turn central axis J1).

The link section 4 has a drive plate (a drive section) 41, a first shaft section 42 connecting the drive plate 41 and the movable plate 2, and a pair of second shaft sections 43 connecting the drive plate 41 and the supporting section 3. Similarly, the link section 5 has a drive plate (a drive section) 51, a first shaft section 52 connecting the drive plate 51 and the movable plate 2, and a pair of second shaft sections 53 connecting the drive plate 51 and the supporting section 3. By structuring the link section 4 as described above, it is possible to displace the movable plate 2 in a plurality of patterns as mentioned earlier with ease and reliability.

Hereinafter, the link sections 4 and 5 will be described specifically. Since the link sections 4 and 5 have a similar structure, only the link section 4 will be described as a representative example, and the description of the link section 5 will be omitted.

As shown in FIG. 3, the pair of second shaft sections 43 is placed so that the second shaft sections 43 face each other in the Y-axis direction with the drive plate 41 placed between the second shaft sections 43, and supports the drive plate 41 by holding the drive plate 41 from both sides. Moreover, each of the pair of second shaft sections 43 is shaped like a bar extending in the Y-axis direction. Furthermore, the pair of second shaft sections 43 can be torsionally deformed about the central axis. Such a pair of second shaft sections 43 is provided coaxially, and the pair of second shaft sections 43 is torsionally deformed about the axis (hereinafter referred to as a "turn central axis J2") and the drive plate 41 turns about the axis.

The drive plate 41 is provided away from the movable plate 2 in the X-axis direction. Moreover, as mentioned above, the drive plate 41 is supported by being held by the pair of second shaft sections 43 from both sides. Such a drive plate 41 has a through-hole 411 formed therein, and a permanent magnet 611 is placed through the through-hole and fixed therein. The permanent magnet 611 is fixed to the drive plate 41 by being fitted (press-fitted) thereinto or an adhesive, for example. Since the permanent magnet 611 is part of the structure of the displacement unit 6, the permanent magnet 611 will be described later.

Moreover, in this embodiment, the planar shape of the drive plate 41 is a rectangle whose longitudinal direction is the Y-axis direction. By forming the drive plate 41 into such a shape, it is possible to reduce the width of the drive plate 41 (the length thereof in the X-axis direction) while ensuring a space in which the permanent magnet 611 is fixed. By reducing the width of the drive plate 41, it is possible to reduce the moment of inertia which is produced when the drive plate 41 turns about the turn central axis J2. This increases the reactivity of the drive plate 41, and allows the drive plate 41 to turn with higher speed. In addition, when the reactivity of the drive plate 41 is increased, it is possible to prevent unnecessary vibration from being created by the turning of the drive plate 41 (in particular, when the drive plate 41 turns quickly and the turning direction changes). This makes it possible to drive the optical scanner 1 with stability.

Incidentally, the planar shape of the drive plate 41 is not limited to a particular shape, and may be a square, a polygon with five or more sides, or a circle.

Such a drive plate 41 is connected to the movable plate 2 by the first shaft section 42. The first shaft section 42 as a whole is provided so as to extend in the X-axis direction. Such a first shaft section 42 has a node section 421 provided between the drive plate 41 and the movable plate 2, a movable plate's-side shaft section 422 connecting the node section 421 and the movable plate 2, and a drive plate's-side shaft section (a drive section's-side shaft section) 423 connecting the node section 421 and the drive plate 41.

The movable plate's-side shaft section 422 and the drive plate's-side shaft section 423 are each shaped like a bar extending in the X-axis direction. Moreover, the movable plate's-side shaft section 422 and the drive plate's-side shaft section 423 are provided coaxially. Preferably, the hardness of the movable plate's-side shaft section 422 and the drive plate's-side shaft section 423 is set at a hardness with which great distortion does not occur when the optical scanner 1 is driven, and, more preferably, is set at a hardness with which virtually no distortion occurs. This makes it possible to displace the movable plate 2 with stability, as will become apparent below. Incidentally, the "displacement" mentioned above refers to bending or curve in the Z-axis direction and torsional deformation about the central axis.

Such movable plate's-side shaft section 422 and drive plate's-side shaft section 423 are connected to each other via the node section 421. The node section 421 is provided between the movable plate's-side shaft section 422 and the drive plate's-side shaft section 423 and connects the movable plate's-side shaft section 422 and the drive plate's-side shaft section 423. As shown in FIG. 3, the node section 421 has a pair of torsional deformation sections 4211 and 4212, a nondeformed section 4213 provided between the torsional deformation sections 4211 and 4212, a pair of connecting sections 4214 connecting the torsional deformation section 4211 to the nondeformed section 4213, and a pair of connecting sections 4215 connecting the torsional deformation section 4212 to the nondeformed section 4213.

The nondeformed section 4213 is shaped like a bar extending in the Y-axis direction. The hardness of such a nondeformed section 4213 is set at a hardness with which the nondeformed section 4213 is not virtually deformed when the optical scanner 1 is driven. As a result, as will become apparent below, it is possible to bend the first shaft section 42 at a central axis J4 of the nondeformed section 4213, and thereby drive the optical scanner 1 with stability. Incidentally, the "deformation" mentioned above refers to bending or curve of the nondeformed section 4213 in the Z-axis direction and torsional deformation of the nondeformed section 4213 about the central axis J4.

The pair of torsional deformation sections 4211 and 4212 is disposed so as to be symmetric with respect to such a nondeformed section 4213. The torsional deformation sections 4211 and 4212 are each shaped like a bar extending in the Y-axis direction. Moreover, the torsional deformation sections 4211 and 4212 are arranged in parallel to each other so as to be away from each other in the X-axis direction.

Moreover, the torsional deformation section 4211 located in a position closer to the movable plate 2 connects to one end of the movable plate's-side shaft section 422 roughly in the center thereof in the longitudinal direction. Similarly, the torsional deformation section 4212 located in a position closer to the drive plate 41 connects to one end of the drive plate's-side shaft section 423 roughly in the center thereof in the longitudinal direction. Such torsional deformation sections 4211 and 4212 can be torsionally deformed about their respective central axes.

Such a torsional deformation section 4211 is connected to the nondeformed section 4213 by the pair of connecting sections 4214, and the torsional deformation section 4212 is connected to the nondeformed section 4213 by the pair of connecting sections 4215.

One of the pair of connecting sections 4214 is provided so as to connect the ends of the torsional deformation section 4211 and the nondeformed section 4213, and the other connecting section is provided so as to connect the other ends of the torsional deformation section 4211 and the nondeformed section 4213. Moreover, one of the pair of connecting sections 4215 is provided so as to connect the ends of the torsional deformation section 4212 and the nondeformed section 4213, and the other connecting section is provided so as to connect the other ends of the torsional deformation section 4212 and the nondeformed section 4213.

Such connecting sections 4214 and 4215 are each shaped like a bar extending in the X-axis direction. Moreover, the connecting sections 4214 and 4215 can curve in the Z-axis direction and can be torsionally deformed about their respective central axes.

This is the end of the specific description of the structure (shape) of the vibration system 8.

As mentioned earlier, the vibration system 8 structured as described above is integrally formed from a SOI substrate. This makes it easy to form the vibration system 8. Specifically, as mentioned earlier, the vibration system 8 has a part which is actively deformed and a part which is not deformed (a part in which deformation is undesirable). On the other hand, the SOI substrate is a substrate in which a first Si layer, a $SiO_2$ layer, and a second Si layer are laid one on top of another in this order. Thus, the part which is not deformed is formed of all the three layers described above and the part which is actively deformed is formed of only the second Si layer, in other words, the SOI substrate is made to have different thicknesses in the part which is not deformed and the part which is deformed. By doing so, it is possible to form the vibration system 8 with ease, the vibration system 8 having the part which is deformed and the part which is not deformed. Incidentally, the part which is actively deformed may be formed of two layers including the second Si layer and the $SiO_2$ layer.

The "part which is actively deformed" includes the second shaft sections 43 and 53, the torsional deformation sections 4211, 4212, 5211, and 5212, and the connecting sections 4214, 4215, 5214, and 5215, and the "part which is not deformed" includes the movable plate's-side shaft sections 422 and 522, the drive plate's-side shaft sections 423 and 523, the drive plates 41 and 51, and the nondeformed sections 4213 and 5213. Moreover, the movable plate 2 and the supporting section 3 other than the link sections 4 and 5 are also included in the "part which is not deformed" described above.

Hereinafter, based on FIGS. 4A to 4C and FIGS. 5A to 5C, an example of a method for producing the vibration system 8 will be described briefly. Incidentally, the method for producing the vibration system 8 is not limited to this example.

First, as shown in FIG. 4A, a SOI substrate (a silicon substrate) 100 in which a first Si layer 110, a $SiO_2$ layer 120, a second Si layer 130 are laid one on top of another in this order is prepared.

Next, as shown in FIG. 4B, $SiO_2$ films M1 and M2 are formed on both surfaces of the SOI substrate 100. Then, as shown in FIG. 4C, the $SiO_2$ film M2 is etched to obtain the planar shapes of the movable plate 2, the supporting section 3, and the pair of link sections 4 and 5 by patterning, and the SiO$_2$ film M1 is etched to obtain the shapes corresponding to the movable plate 2, the supporting section 3, the drive plates 41 and 51, the movable plate's-side shaft sections 422 and 522, the drive plate's-side shaft sections 423 and 523, and the nondeformed sections 4213 and 5213 by patterning.

Then, as shown in FIG. 5A, the SOI substrate 100 is etched via the SiO$_2$ film M1. At this time, the SiO$_2$ layer 120 which is an intermediate layer of the SOI substrate 100 functions as a stop layer of the above etching. After the completion of the etching, the SOI substrate 100 is then etched via the SiO$_2$ film M2. Also at this time, the SiO$_2$ layer 120 which is the intermediate layer of the SOI substrate 100 functions as a stop layer of the above etching.

Incidentally, an etching method is not limited to a particular method, and, for example, one or two or more of a physical etching method such as plasma etching, reactive ion etching, beam etching, and photo-assisted etching and a chemical etching method such as wet etching can be used alone or in combination. It is to be noted that the similar method can be used in etching in each of the following processes.

Next, as shown in FIG. 5B, by removing the exposed portions of the SiO$_2$ films M1 and M2 and the SiO$_2$ layer 120 by etching by using BFH (buffered hydrofluoric acid) or the like, the outside shapes of the movable plate 2, the supporting section 3, and the pair of link sections 4 and 5 are obtained.

Furthermore, as shown in FIG. 5C, a metal film is formed on the upper surface 21 of the movable plate 2, whereby the light reflecting section 22 is formed. The methods for forming the metal film (the light reflecting section 22) include a dry plating method such as vacuum vapor deposition, sputtering (low-temperature sputtering), and ion plating, a wet plating method such as electrolytic plating and nonelectrolytic plating, thermal spraying, bonding of metal foil, and the like.

In this way, the vibration system 8 is obtained.

1-2. Pedestal 9

As shown in FIG. 2, the pedestal 9 has a flat plate-shaped base 91 and a frame section 92 provided along the edge of the base 91, and is shaped like a box (a square measuring cup). Such a pedestal 9 is bonded to the lower surface of the supporting section 3 of the vibration system 8 by the frame section 92. As a result, the vibration system 8 is supported by the pedestal 9. A chief material of such a pedestal 9 is glass or silicon, for example. Incidentally, the method for bonding the pedestal 9 to the supporting section 3 is not limited to a particular method. The pedestal 9 may be bonded to the supporting section 3 by using an adhesive, for example, and various bonding methods such as anodic bonding may be used.

1-3. Displacement Unit 6

As shown in FIG. 1, the displacement unit 6 includes a first displacement unit 61 having a permanent magnet 611, a coil 612, and a power supply 613, and a second displacement unit 62 having a permanent magnet 621, a coil 622, and a power supply 623. The first displacement unit 61 is provided for the link section 4, and the second displacement unit 62 is provided for the link section 5. This simplifies the structure of the displacement unit 6.

Incidentally, since the first displacement unit 61 and the second displacement unit 62 have a similar structure, only the first displacement unit 61 will be described as a representative example, and the description of the second displacement unit 62 will be omitted.

As shown in FIG. 6, the permanent magnet 611 is shaped like a bar, and is magnetized in the longitudinal direction thereof. That is, the permanent magnet 611 has a south pole at one end thereof and has a north pole at the other end thereof in the longitudinal direction. Such a permanent magnet 611 is placed through the through-hole 411 formed in the drive plate 41, and is fixed to the drive plate 41 roughly in the center thereof in the longitudinal direction. In addition, the permanent magnet 611 projects from upper and lower faces of the drive plate 41 in such a way that the lengths of the upper and lower projected portions become the same, and the south pole and the north pole face each other with the drive plate 41 placed between these poles. As a result, it is possible to displace the movable plate 2 with stability, as will be described later.

Moreover, the permanent magnet 611 is provided so that the longitudinal direction thereof is perpendicular to a planar direction of the drive plate 41. Furthermore, the permanent magnet 611 is provided so that the central axis thereof intersects with the turn central axis J2.

Such a permanent magnet 611 is not limited to a particular type, and a magnetized hard magnetic material such as a neodymium magnet, a ferrite magnet, a samarium-cobalt magnet, an alnico magnet, and a bonded magnet can be used suitably.

Incidentally, in this embodiment, the permanent magnet 611 is shaped like a bar; however, the shape of the permanent magnet is not limited to a particular shape. For example, the permanent magnet 611 may be shaped like a plate. In this case, the permanent magnet 611 is magnetized in a planar direction, and is fixed to the drive plate 41 in such a way that the planar direction is perpendicular to the X-axis direction. This makes it possible to shorten the length of the permanent magnet 611 in the X-axis direction and thereby reduce the moment of inertia which is produced by the turning of the drive plate 41.

The coil 612 produces a magnetic field which acts on the permanent magnet 611. Such a coil 612 is disposed near the outside of the vibration system 8 so as to face the permanent magnet 611 in the X-axis direction. Moreover, the coil 612 is provided so that the coil 612 can produce a magnetic field in the X-axis direction, that is, the coil 612 can produce a state in which the side of the coil 612 which faces the permanent magnet 611 becomes a north pole and the side thereof facing away from the permanent magnet 611 becomes a south pole and a state in which the side of the coil 612 which faces the permanent magnet 611 becomes a south pole and the side thereof facing away from the permanent magnet 611 becomes a north pole.

The optical scanner 1 of this embodiment has a coil fixing section 64 which is provided outside the vibration system 8 and is fixed to the pedestal 9, and the coil 612 is wound around a projecting section 641 of the coil fixing section 64, the projecting section 641 extending in the X-axis direction. With such a structure, it is possible to fix the coil 612 to the vibration system 8 and produce the above-described magnetic field with ease. Moreover, by using a soft magnetic material such as iron to form the projecting section 641, it is possible to use the projecting section 641 as a magnetic core of the coil 612, and it is also possible to produce the above-described magnetic field more efficiently.

The power supply 613 is electrically connected to the coil 612. In addition, by applying an intended voltage to the coil 612 from the power supply 613, it is possible to produce the above-described magnetic field from the coil 612. In this embodiment, the power supply 613 can selectively apply an alternating voltage and a direct-current voltage. Moreover, when the alternating voltage is applied, the strength and frequency thereof can be changed, and an offset voltage (a direct-current voltage) can also be superimposed on the alternating voltage.

2. Operation of Optical Scanner 1

Next, the operation of the optical scanner will be described.

As mentioned earlier, in the optical scanner 1, a pattern can be selected from a pattern in which the movable plate 2 is turned, a pattern in which the movable plate 2 is vibrated, and a pattern in which the movable plate 2 is made to come to rest in a predetermined position. Hereinafter, these three patterns will be described sequentially. Incidentally, in the following description, for convenience of explanation, a structure in which both the permanent magnets 611 and 621 are disposed with the north poles placed in an upper position will be described as a representative example.

2-1. Turning

First, the alternating voltages are applied to the coils 612 and 622 from the power supplies 613 and 623 in such a way that a state changes between a first state in which the side of the coil 612 which faces the permanent magnet 611 becomes a north pole and the side of the coil 622 which faces the permanent magnet 621 becomes a south pole and a second state in which the side of the coil 612 which faces the permanent magnet 611 becomes a south pole and the side of the coil 622 which faces the permanent magnet 621 becomes a north pole alternately and periodically. It is preferable that the alternating voltages applied to the coils 612 and 622 from the power supplies 613 and 623 have the same waveform (the same strength and frequency).

Figure 7A:
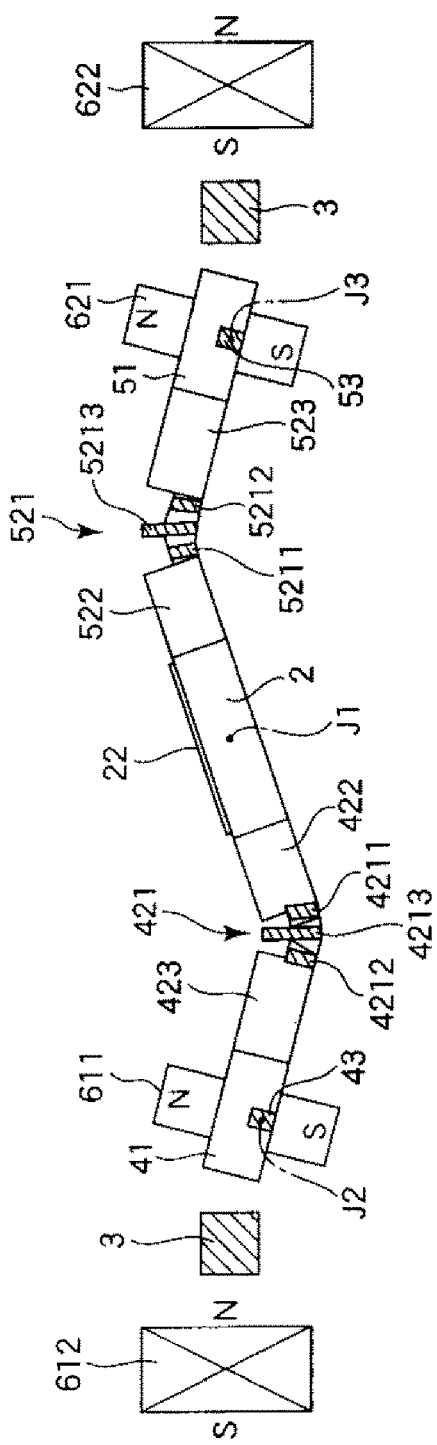
FIGS. 7A and 7B are diagrams explaining the driving of the optical scanner shown in FIG. 1.

In the first state shown in FIG. 7A, since the south pole of the permanent magnet 611 is attracted to the coil 612 and the north pole moves away from the coil 612, the drive plate 41 tilts about the turn central axis J2 in such a way as to direct the upper surface thereof toward the movable plate 2 while torsionally deforming the pair of second shaft sections 43. With this, since the north pole of the permanent magnet 621 is attracted to the coil 622 and the south pole moves away from the coil 622, the drive plate 51 tilts about the turn central axis J3 in such a way as to direct the lower surface thereof toward the movable plate 2 while torsionally deforming the pair of second shaft sections 53. That is, both the drive plates 41 and 51 tilt in a clockwise direction in FIG. 7A.

With the tilt of the drive plates 41 and 51, the drive plate's-side shaft section 423 tilts in such a way that the end thereof which is closer to the movable plate 2 faces downward, and the drive plate's-side shaft section 523 tilts in such a way that the end thereof which is closer to the movable plate 2 faces upward. As a result, the ends of the drive plate's-side shaft sections 423 and 523 which are closer to the movable plate 2 are moved off center in the Z-axis direction.

Then, as a result of the ends of the drive plate's-side shaft sections 423 and 523 which are closer to the movable plate 2 being moved off center in the Z-axis direction, the movable plate's-side shaft sections 422 and 522 and the movable plate 2 integrally tilt in a counterclockwise direction in FIG. 7A while torsionally deforming the torsional deformation sections 4211, 4212, 5211, and 5212 about the central axes thereof and curving and deforming the connecting sections 4214, 4215, 5214, and 5215.

As described above, in the first state, as a result of the first shaft section 42 of the link section 4 being deformed in such a way as to bend downward at the node section 421 provided at the midpoint thereof (that is, into the shape of a letter V projecting downward) and the first shaft section 52 of the link section 5 being deformed in such a way as to bend upward at the node section 521 provided at the midpoint thereof (that is, into the shape of a letter V projecting upward), the movable plate 2 tilts about the turn central axis J1 in a counterclockwise direction in FIG. 7A.

Figure 7B:
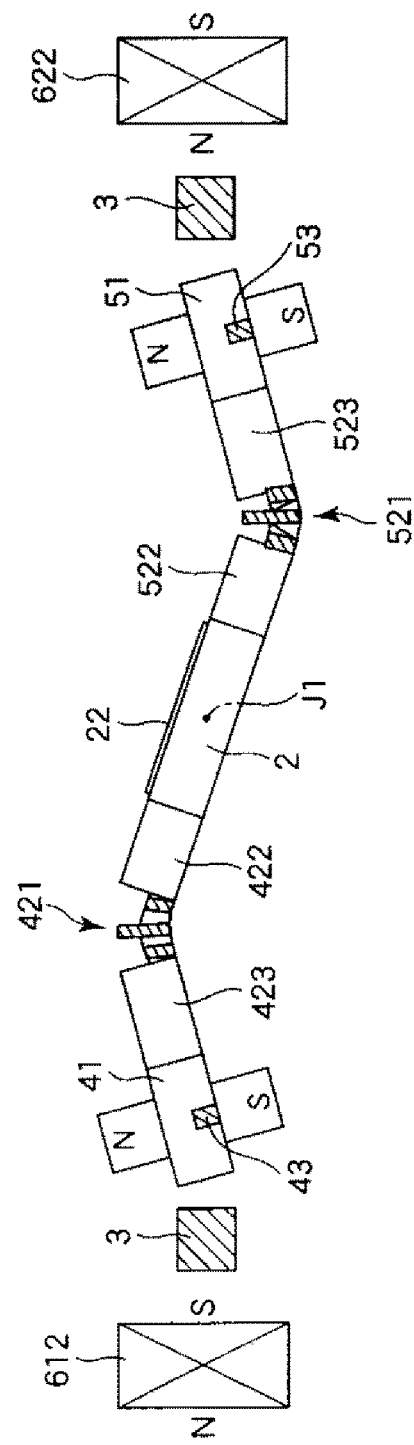

On the other hand, in the second state shown in FIG. 7B, a deformation opposite to the first state described above occurs. That is, in the second state, as a result of the first shaft section 42 of the link section 4 bending and being deformed upward at the node section 421 and the first shaft section 52 of the link section 5 bending and being deformed downward at the node section 521, the movable plate 2 tilts about the turn central axis J1 in the counterclockwise direction in FIG. 7B.

By changing a state between the above-described first state and the above-described second state alternately, it is possible to turn the movable plate 2 about the turn central axis J1.

Incidentally, the frequencies of the alternating voltages applied to the coils 612 and 622 are not limited to a particular frequency, and may be equal to or lower than the resonance frequency of the vibration system formed of the movable plate 2 and the link sections 4 and 5. However, it is preferable that the frequencies of the alternating voltages be lower than the resonance frequency. That is, it is preferable to drive the optical scanner 1 in a nonresonant manner. This makes it possible to drive the optical scanner 1 more stably.

Here, in the optical scanner 1 of this embodiment, since the drive plate's-side shaft section 423 and the movable plate's-side shaft section 422 are not virtually deformed in the link section 4, it is possible to bend the first shaft section 42 at the node section 421 with ease. The same goes for the link section 5. As a result, it is possible to realize the above-described stable turning of the movable plate 2.

Moreover, since the node section 421 has the nondeformed section 4213 in the link section 4, it is possible to bend the first shaft section 42 at the nondeformed section 4213 locally. The same goes for the link section 5. As a result, it is possible to bend the first shaft sections 42 and 52 with ease and reliability and turn the movable plate 2 with stability.

Moreover, as a result of the node section 421 having the torsional deformation section 4211 connected to the movable plate's-side shaft section 422 and the torsional deformation section 4212 connected to the drive plate's-side shaft section 423 in the link section 4 and the torsional deformation sections 4211 and 4212 being torsionally deformed when the first shaft section 42 bends, the stress produced by bending is effectively alleviated (cancelled). The same goes for the link section 5. This makes it possible to bend the first shaft sections 42 and 52 reliably as described above, and prevent the breakdown of the first shaft sections 42 and 52. That is, it is possible to drive the optical scanner 1 with stability.

Incidentally, the movable plate 2 can be turned in the manner described below. That is, a (+) or (−) offset voltage (a direct-current voltage) may be superimposed on the alternating voltages applied to the coils 612 and 622 from the power supplies 613 and 623. In other words, the force by which the north poles of the permanent magnets 611 and 621 are attracted to the coils 612 and 622 (hereinafter referred to simply as the "north pole attraction force") may be different from the force by which the south poles of the permanent magnets 611 and 621 are attracted to the coils 612 and 622 (hereinafter referred to simply as the "south pole attraction force").

Hereinafter, specific descriptions will be given. In the descriptions, the above-described state in which the north pole attraction force and the south pole attraction force are the same will be referred to as a "normal state".

Figure 8:
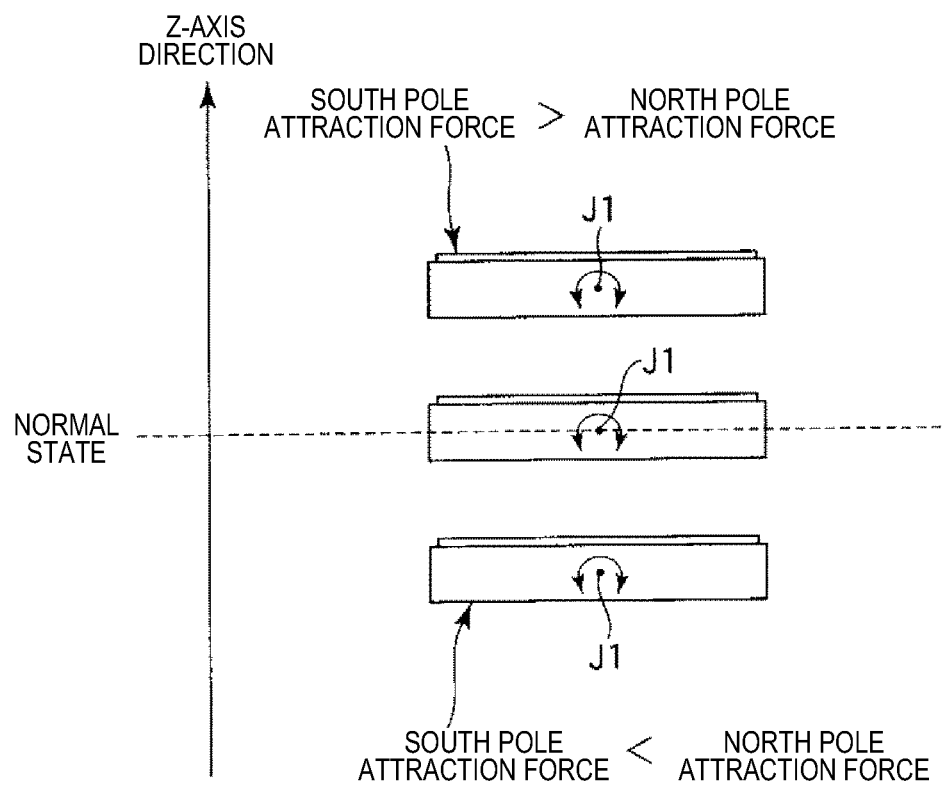
FIG. 8 is a diagram explaining the driving of the optical scanner shown in FIG. 1.

When the south pole attraction force of the coils 612 and 622 is stronger than the north pole attraction force, the upper dead center and the lower dead center (the points at which the turning direction changes) of the turning of the drive plates 41 and 51 are moved upward as compared to the normal state. As a result, as shown in FIG. 8, the turn central axis J1 of the movable plate 2 is moved upward as compared to the normal state. Conversely, when the south pole attraction force of the coils 612 and 622 is weaker than the north pole attraction force, the upper dead center and the lower dead center of the turning of the drive plates 41 and 51 are moved downward as compared to the normal state. As a result, the turn central axis J1 of the movable plate 2 is moved downward as compared to the normal state.

As described above, by superimposing the offset voltage on the alternating voltages applied to the coils 612 and 622 from the power supplies 613 and 623, it is possible to displace the turn central axis J1 of the movable plate 2 in the Z-axis direction. As a result, when, for example, the optical scanner 1 is incorporated into an image forming apparatus such as a projector, it is possible to adjust the optical length of the light emitted from a light source, the optical length to the movable plate 2, even after the image forming apparatus is assembled. That is, although the positioning of the light source and the movable plate 2 is performed precisely at the time of assembly of the image forming apparatus, even if the positions of these components become different from the set values, it is possible to correct the positions of the light source and the movable plate 2 after assembly.

2-2. Vibration

First, the alternating voltages are applied to the coils 612 and 622 from the power supplies 613 and 623 in such a way that a state changes between a first state in which both the side of the coil 612 which faces the permanent magnet 611 and the side of the coil 622 which faces the permanent magnet 621 become north poles and a second state in which both the side of the coil 612 which faces the permanent magnet 611 and the side of the coil 622 which faces the permanent magnet 621 become south poles alternately and periodically. It is preferable that the alternating voltages applied to the coils 612 and 622 from the power supplies 613 and 623 have the same waveform.

In the first state shown in FIG. 9A, in the same manner as in the above-described turning, both the drive plates 41 and 51 tilt about the turn central axes J2 and J3 in such a way as to direct the upper surfaces thereof toward the movable plate 2. As a result of the drive plates 41 and 51 tilting in the manner described above, both the drive plate's-side shaft sections 423 and 523 tilt in such a way that the ends thereof which are closer to the movable plate 2 are located below the ends thereof which are closer to the drive plate 41. As a result, the ends of the drive plate's-side shaft sections 423 and 523, the ends which are closer to the movable plate 2, move downward, as compared to the natural state, by the same distance.

As described above, as a result of both ends of the drive plate's-side shaft sections 423 and 523, the ends which are closer to the movable plate 2, moving downward by the same distance, the movable plate's-side shaft sections 422 and 522 and the movable plate 2 integrally move downward with the posture (that is, the planar direction) of the movable plate 2 kept constant while torsionally deforming the torsional deformation sections 4211 and 4212 of the node section 421 and the torsional deformation sections 5211 and 5212 of the node section 521 about the central axes thereof.

On the other hand, in the second state shown in FIG. 9B, both the drive plates 41 and 51 tilt about the turn central axes J2 and J3 in such a way as to direct the lower surfaces thereof toward the movable plate 2. As a result of the drive plates 41 and 51 tilting in the manner described above, both the drive plate's-side shaft sections 423 and 523 tilt in such a way that the ends thereof which are closer to the movable plate 2 are located above the ends thereof which are closer to the drive plate 41. As a result, the ends of the drive plate's-side shaft sections 423 and 523, the ends which are closer to the movable plate 2, move upward, as compared to the natural state, by the same distance.

As described above, as a result of both ends of the drive plate's-side shaft sections 423 and 523, the ends which are closer to the movable plate 2, moving upward by the same distance, the movable plate's-side shaft sections 422 and 522 and the movable plate 2 integrally move upward with the posture of the movable plate 2 kept constant while torsionally deforming the torsional deformation sections 4211 and 4212 of the node section 421 and the torsional deformation sections 5211 and 5212 of the node section 521 about the central axes thereof.

By changing a state between the above-described first state and the above-described second state alternately, it is possible to vibrate the movable plate 2 in the Z-axis direction while keeping the posture thereof, that is, keeping the front surface (the reflecting surface) of the light reflecting section 22 parallel to the X-Y plane.

Incidentally, the frequencies of the alternating voltages applied to the coils 612 and 622 are not limited to a particular frequency, and may be equal to or lower than the resonance frequency of the vibration system formed of the movable plate 2 and the link sections 4 and 5. However, it is preferable that the frequencies of the alternating voltages be equal to the resonance frequency. That is, it is preferable to drive the optical scanner 1 in a resonant manner. This makes it possible to drive the optical scanner 1 more stably.

Also in such a vibration pattern, as is the case with the turning pattern described above, by superimposing the offset voltage on the alternating voltages applied to the coils 612 and 622, it is possible to vibrate the movable plate 2 by shifting the movable plate 2 upward (toward the side opposite to the pedestal 9) from the natural state or vibrate the movable plate 2 by shifting the movable plate 2 downward (toward the pedestal 9) from the natural state.

2-3. Static Pattern

For example, the direct-current voltages are applied to the coils 612 and 622 from the power supplies 613 and 623 in such a way that both the side of the coil 612 which faces the permanent magnet 611 and the side of the coil 622 which faces the permanent magnet 621 become north poles. It is preferable that the direct-current voltages applied to the coils 612 and 622 from the power supplies 613 and 623 have the same strength. When such voltages are applied to the coils 612 and 622, the movable plate 2 comes to rest in a state shown in FIG. 9A. On the other hand, when the direct-current voltages are applied to the coils 612 and 622 from the power supplies 613 and 623 in such a way that both the side of the coil 612 which faces the permanent magnet 611 and the side of the coil 622 which faces the permanent magnet 621 become south poles, the movable plate 2 comes to rest in a state shown in FIG. 9B. That is, the movable plate 2 is kept at a position which is different from the position in the natural state.

According to such driving, since, for example, it is possible to displace the optical path of the light reflected by the light reflecting section 22 from the position in the natural state, such driving is particularly effective when the optical scanner 1 is used as an optical switch, for example.

Moreover, for example, when the optical scanner 1 is incorporated into an image forming apparatus such as a projector, by moving the movable plate 2 to a position which is different from the position in the natural state (a position which does not intersect with the optical path of the laser) if there is a need to stop emission of the laser toward the outside of the apparatus due to, for example, abnormal laser emitted from the light source, the reflection of the laser by the light reflecting section 22 is prevented. This makes it possible to prevent the laser from being emitted to the outside of the apparatus. Moreover, emission of the laser to the outside of the apparatus may be prevented by changing the optical path of the laser reflected by the light reflecting section 22 by displacing the movable plate 2. This eliminates the need to incorporate an extra safety mechanism for solving such a problem, and simplifies the production process of the image forming apparatus, whereby it is possible to reduce production costs.

The movable plate 2 can also be maintained in a state in which the movable plate 2 is tilted as compared to the natural state by applying such static driving of the movable plate 2 and making the strengths of the direct-current voltages applied to the coils 612 and 622 different from each other. Moreover, by changing the strengths of the direct-current voltages applied to the coils 612 and 622 with time, it is also possible to displace the movable plate 2 continuously or irregularly in stages.

This is the end of the detailed description of the driving of the optical scanner 1.

Here, the structure of the optical scanner 1 is described again. As shown in FIG. 1, when the distance between the turn central axis J1 and the central axis J4 of the nondeformed section 4213 is L1 and the distance between the central axis J4 of the nondeformed section 4213 and the turn central axis J2 is L2, the magnitude relation between L1 and L2 is not limited to a particular relation; the relation may be L1>L2, L1=L2, or L1<L2 (the same goes for the link section 5).

When L1=L2, the movable plate's-side shaft section 422 and the drive plate's-side shaft section 423 are equal in tilt with respect to the X axis when the movable plate 2 is turned (when the first shaft section 42 bends). As a result, in this case, almost the same torque is applied to the torsional deformation sections 4211 and 4212. This makes it possible to bend the first shaft section 42 more efficiently. When L1>L2, as compared with when L1=L2, it is possible to make the turning angle of the movable plate 2 small; conversely, when L1<L2, as compared with when L1=L2, it is possible to make the turning angle of the movable plate 2 large. As described above, the relation between L1 and L2 may be set appropriately based on the use of the optical scanner 1.

Moreover, as described above, when L1=L2, since almost the same torque is applied to the torsional deformation sections 4211 and 4212, it is preferable to form the torsional deformation sections 4211 and 4212 to have the same shape (physical characteristics: ease of torsional deformation). This makes it possible to prevent excessive torsion or insufficient torsion in any one of the torsional deformation sections 4211 and 4212, making it possible to bend the first shaft section 42 smoothly.

Furthermore, when L1>L2, since the tilt of the drive plate's-side shaft section 423 with respect to the X axis when the first shaft section 42 bends becomes greater than the tilt of the movable plate's-side shaft section 422, the torque applied to the torsional deformation section 4212 becomes larger than the torque applied to the torsional deformation section 4211. Therefore, in this case, it is preferable that the torsional deformation section 4212 be formed so as to be torsionally deformed more easily than the torsional deformation section 4211. Specifically, it is preferable that, for example, the width of the torsional deformation section 4212 be smaller than the width of the torsional deformation section 4211. The reason is as follows. As mentioned earlier, since the link section 4 is formed by etching the SOI substrate 100 in the thickness direction thereof, control of the width coincident with the planar direction of the SOI substrate 100 can be performed easily and without an increase in the number of processes.

Moreover, when L1<L2, contrary to the case in which L1>L2, it is preferable that the torsional deformation section 4211 be formed so as to be torsionally deformed more easily than the torsional deformation section 4212.

Second Embodiment

Next, a second embodiment of the optical scanner of the invention will be described.

Figure 10:
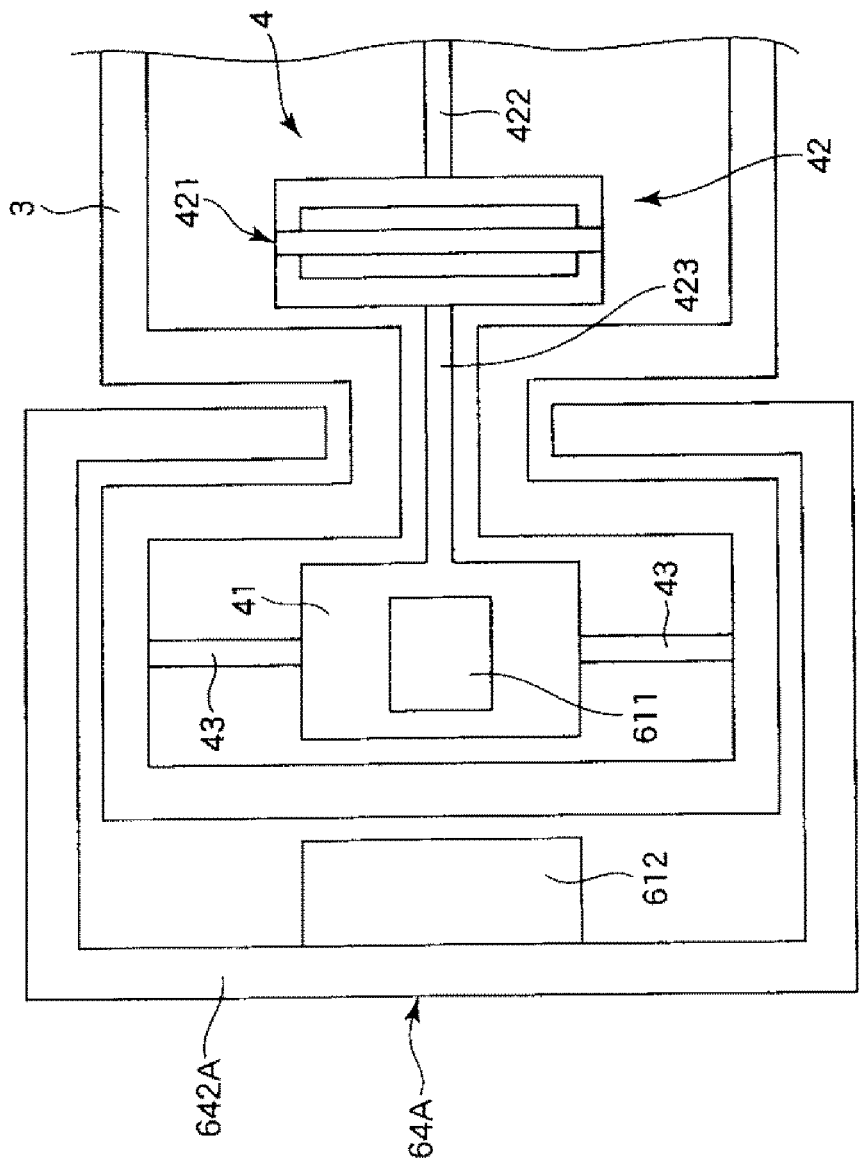
FIG. 10 is a plan view showing a second embodiment of the optical scanner according to the invention.

FIG. 10 is a plan view showing the second embodiment of the optical scanner of the invention.

Hereinafter, regarding the optical scanner of the second embodiment, only differences from the optical scanner of the embodiment described above are explained, and the explanations of such matters as are found also in the embodiment described above will be omitted.

The optical scanner of the second embodiment is almost the same as the optical scanner 1 of the first embodiment except for the structure of the coil fixing section. It is to be noted that such components as are found also in the first embodiment described above will be identified with the same reference characters.

In the optical scanner 1 of this embodiment, a coil fixing section 64A has a main body section 642A formed so as to surround a coil 612 and a permanent magnet 611 (by removing a portion corresponding to the first shaft section 42). Such a main body section 642A prevents or inhibits the magnetic force produced from the coil 612 from leaking to the outside of the coil fixing section 64A while acting on the permanent magnet 611. That is, the main body section 642A has magnetic shielding capability. As a result, for example, it is possible to prevent the magnetic field produced from the coil 612 from acting on the permanent magnet 621 located on the opposite side and drive the optical scanner 1 with stability.

The structure of the main body section 642A is not limited to a particular structure as long as the above-described effect can be obtained. For example, the main body section 642A may be formed of a soft magnetic material used as a core material, or may have a front surface to which magnetic shielding paint is applied.

Incidentally, an unillustrated coil fixing section fixing a coil 622 has a structure similar to that of the coil fixing section 64A.

According to such a second embodiment, it is possible to obtain the same effects as those of the first embodiment.

Third Embodiment

Next, a third embodiment of the optical scanner of the invention will be described.

Figure 11:
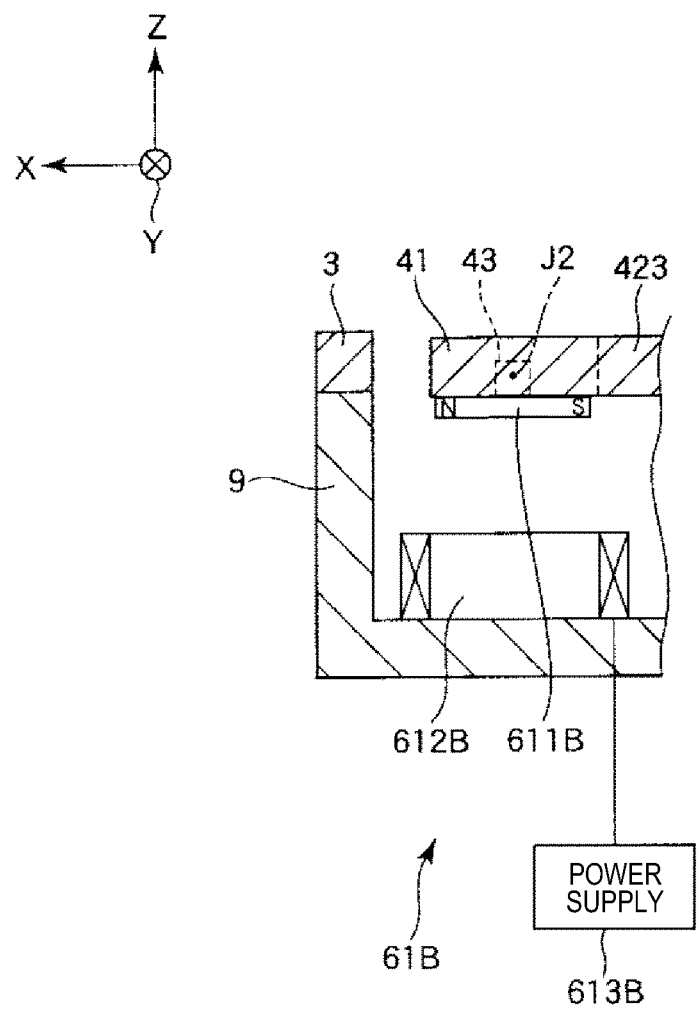
FIG. 11 is a plan view showing a third embodiment of the optical scanner according to the invention.

FIG. 11 is a plan view showing the third embodiment of the optical scanner of the invention.

Hereinafter, regarding the optical scanner of the third embodiment, only differences from the optical scanners of the embodiments described above are explained, and the explanations of such matters as are found also in the embodiments described above will be omitted.

The optical scanner of the third embodiment is almost the same as the optical scanners described above except for the structure of the displacement unit. Incidentally, in this embodiment, since a first displacement unit and a second displacement unit of the displacement unit have a similar structure, only the first displacement unit will be described as a representative example, and the description of the second displacement unit will be omitted. Moreover, such components as are found also in the first embodiment described earlier will be identified with the same reference characters.

As shown in FIG. 11, a first displacement unit 61B has a permanent magnet 611B, a coil 612B, and a power supply 613B. The permanent magnet 611B is shaped like a flat plate, and is fixed to a lower surface (a surface facing the pedestal 9) of the drive plate 41. Moreover, the permanent magnet 611B is provided in such a way that the south pole and the north pole face each other with respect to the turn central axis J2 in a state in which the permanent magnet 611B is fixed to the drive plate 41.

The coil 612B is provided below the permanent magnet 611. The coil 612B can produce a magnetic field in the X-axis direction when a voltage is applied thereto from the power supply 613B. By attracting one of the south pole and the north pole of the permanent magnet 611B to the coil 612B and moving the other magnet away from the coil 612B by the action of the magnetic field produced from the coil 612B, it is possible to tilt the drive plate 41 about the turn central axis J2.

According to such a third embodiment, it is also possible to obtain the same effects as those of the first embodiment.

Fourth Embodiment

Next, a fourth embodiment of the optical scanner of the invention will be described.

Figure 12:
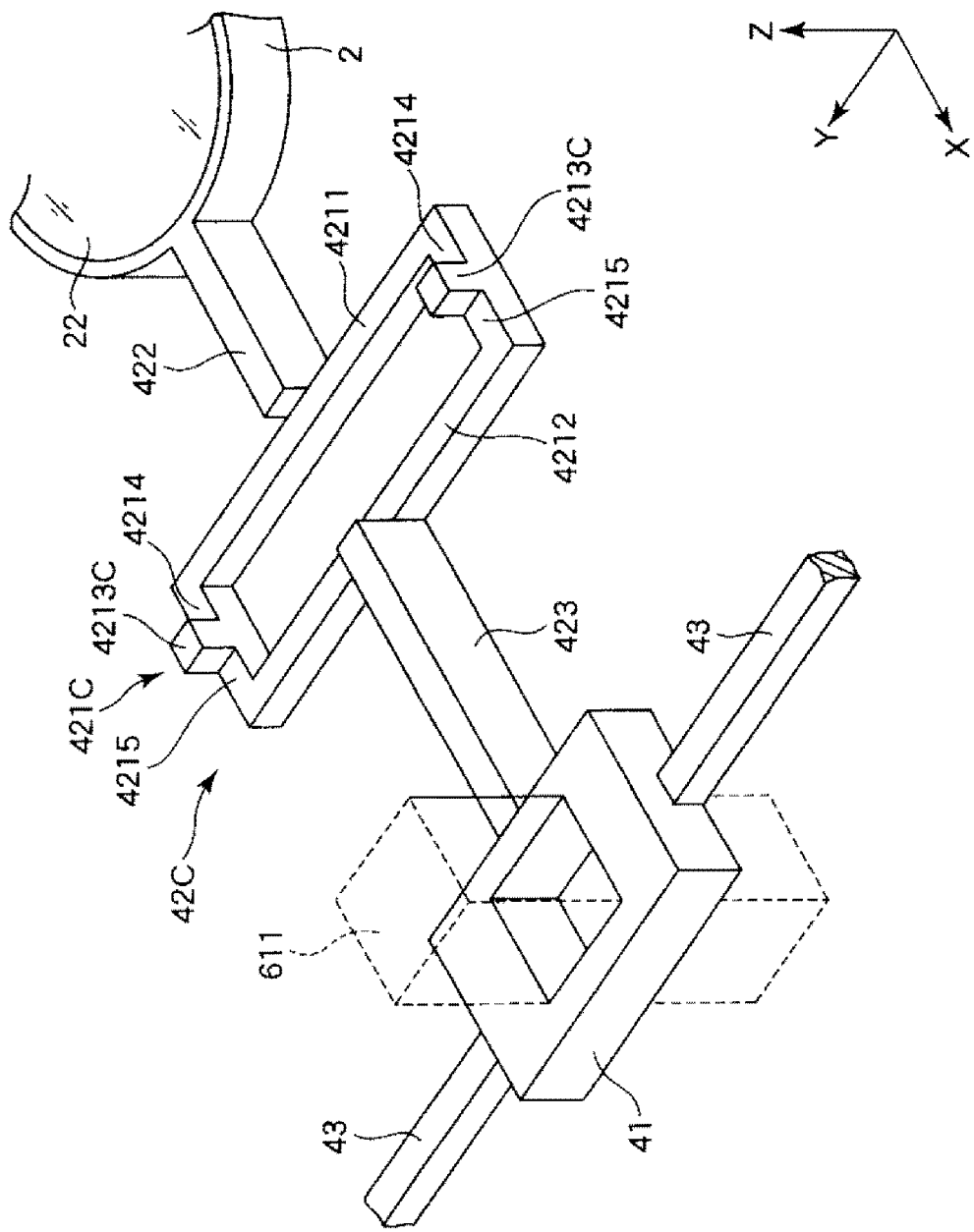
FIG. 12 is a perspective view showing a fourth embodiment of the optical scanner according to the invention.

FIG. 12 is a perspective view showing the fourth embodiment of the optical scanner of the invention.

Hereinafter, regarding the optical scanner of the fourth embodiment, only differences from the optical scanners of the embodiments described above are explained, and the explanations of such matters as are found also in the embodiments described above will be omitted.

The optical scanner of the fourth embodiment is almost the same as the optical scanners described above except for the structure of the nondeformed section of the node section of each link section. Incidentally, in this embodiment, since the nondeformed sections of the link sections 4 and 5 have a similar structure, only the link section 4 will be described as a representative example, and the description of the link section 5 will be omitted. Moreover, such components as are found also in the first embodiment described earlier will be identified with the same reference characters.

As shown in FIG. 12, in a node section 421C of a link section 4C, a pair of nondeformed sections 4213C is provided. The pair of nondeformed sections 4213C are away from each other in the Y-axis direction and are located on one axis line which is parallel to the Y axis. Also with the link section 4C structured as described above, it is possible to bend a first shaft section 42C locally at a line segment connecting the pair of nondeformed sections 4213C.

According to such a fourth embodiment, it is also possible to obtain the same effects as those of the first embodiment.

The optical scanners described above can be suitably applied to an image forming apparatus such as a projector, a laser printer, an imaging display, a barcode reader, and a confocal scanning microscope. As a result, it is possible to provide an image forming apparatus with good drawing characteristics.

Figure 13:
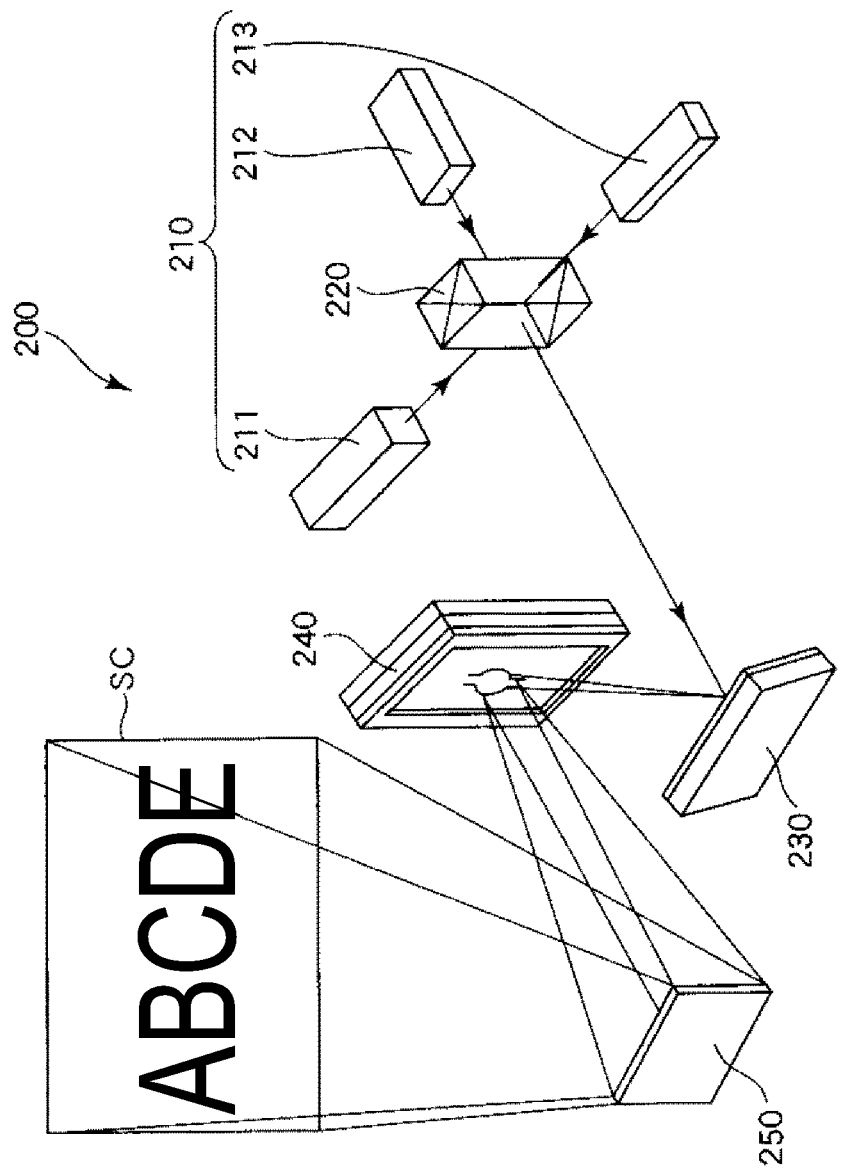
FIG. 13 is a diagram showing the outline of an image forming apparatus according to the invention.

Specifically, a projector 200 shown in FIG. 13 will be described. Incidentally, for convenience of explanation, a longitudinal direction of a screen SC is referred to as a "lateral direction" and a direction perpendicular to the longitudinal direction is referred to as a "vertical direction".

The projector 200 has a light source device 210 which emits a light such as a laser, a cross-dichroic prism 220, a pair of optical scanners 230 and 240 according to the invention (for example, the optical scanners having a structure similar to that of the optical scanner 1), and a stationary mirror 250.

The light source device 210 includes a red light source device 211 emitting a red light, a blue light source device 212 emitting a blue light, and a green light source device 213 emitting a green light.

The cross-dichroic prism 220 is formed of four right-angle prisms bonded together, and is an optical element which combines the lights emitted from the red light source device 211, the blue light source device 212, and the green light source device 213.

Such a projector 200 is so configured that the lights emitted from the red light source device 211, the blue light source device 212, and the green light source device 213 based on the image information from an unillustrated host computer are combined by the cross-dichroic prism 220, the combined light is scanned by the optical scanners 230 and 240 and is then reflected by the stationary mirror 250, and a color image is formed on the screen SC.

Here, the optical scanning performed by the optical scanners 230 and 240 will be described specifically.

First, the light combined by the cross-dichroic prism 220 is scanned by the optical scanner 230 in the lateral direction (main scanning). Then, the light scanned in the lateral direction is scanned in the vertical direction by the optical scanner 240 (sub-scanning). By doing so, it is possible to form a two-dimensional color image on the screen SC.

Such a scan method is so-called raster scanning. In addition to that method, the light may be scanned on the screen SC by using so-called vector scanning. The vector scanning is a method by which the light emitted from the light source device 210 is scanned on the screen SC in such a way as to form line segments sequentially, the line segments each connecting two different points on the screen SC. That is, the vector scanning is a method by which an intended image is formed on the screen SC by gathering minute straight lines. Here, since the optical scanner according to the invention can displace the movable plate 2 irregularly in stages as described above, the optical scanner according to the invention is also suitable for such vector scanning.

By using the optical scanner according to the invention as the optical scanners 230 and 240 described above, it is possible to obtain extremely good drawing characteristics.

However, the projector 200 is not limited to that described above as long as it is so structured as to scan the light by the optical scanner and form an image on an object. For example, the stationary mirror 250 may be omitted.

Although the optical scanner and the image forming apparatus according to the invention have been described by way of embodiments shown in the drawings, the invention is not limited to them. For example, in the optical scanner and the image forming apparatus according to the invention, the structure of each section can be replaced with any structure with a similar function, and any component can be added. Moreover, for example, in the optical scanner according to the invention, the embodiments described above can be combined appropriately.

The entire disclosure of Japanese Patent Application No. 2010-037996, filed Feb. 23, 2010 is expressly incorporated by reference herein.

What is claimed is:

1. An optical scanner comprising:
a light reflecting section having light reflectivity;
a movable section which includes the light reflecting section and can be displaced;
two link sections connected to positions of ends of the movable section, the positions facing each other;

a supporting section supporting the link sections; and
a displacement providing section turning the two link sections,
wherein each link section includes:
a turnable drive section, and
a shaft section connecting the movable section and the turnable drive section and bending in a thickness direction of the movable section by turning of the turnable drive section; and
wherein when two axes which are at right angles to one another in a plan view of the movable section are an X axis and a Y axis,
each of the two link sections has the turnable drive section placed so as to be away from the movable section in an X-axis direction, a first shaft section which is the shaft section connecting the movable section and the turnable drive section and extending in the X-axis direction, and a second shaft section connecting the turnable drive section and the supporting section and extending in a Y-axis direction, and
the first shaft section is bent by making the displacement providing section turn the turnable drive section about the Y axis while torsionally deforming the second shaft section.

2. The optical scanner according to claim 1, wherein the first shaft section of each link section has a node section provided at a midpoint in an extending direction, a movable section's-side shaft section connecting the node section and the movable section, and a turnable drive section's-side shaft section connecting the node section and the turnable drive section, and bends at the node section.

3. The optical scanner according to claim 2, wherein the node section of each link section has a torsional deformation section which is torsionally deformed about the Y axis.

4. The optical scanner according to claim 3, wherein the node section of each link section has a pair of torsional deformation sections, and
one of the pair of torsional deformation sections is connected to the movable section's-side shaft section, and the other torsional deformation section is connected to the turnable drive section's-side shaft section.

5. The optical scanner according to claim 4, wherein the node section of each link section is provided between the pair of torsional deformation sections, and has a nondeformed section which extends in the Y-axis direction and is not torsionally deformed about the Y axis.

6. The optical scanner according to claim 5, wherein each link section is formed of a 501 substrate in which a first Si layer, a SiO$_2$ layer, and a second Si layer are laid one on top of another in this order.

7. The optical scanner according to claim 6, wherein the movable section's-side shaft section, the nondeformed section, the turnable drive section's-side shaft section, and the turnable drive section of each link section are each formed of the first Si layer, the SiO$_2$ layer, and the second Si layer, and the torsional deformation section and the second shaft section are each formed of the second Si layer.

8. The optical scanner according to claim 2, wherein the movable section's-side shaft section and the turnable drive section's-side shaft section of each link section are not virtually deformed.

9. The optical scanner according to claim 1, wherein the first shaft section of each link section can cause a first deformation by which the first shaft section bends at the node section so as to be deformed into the shape of a letter V projecting toward one side in the thickness direction of the movable section and a second deformation by which the first shaft section bends at the node section so as to be deformed into the shape of a letter V projecting toward the other side in the thickness direction of the movable section.

10. The optical scanner according to claim 9, wherein the movable section is turned about the Y axis by making the displacement providing section alternately repeat a state in which one of the first shaft sections of the link sections causes the first deformation and the other first shaft section causes the second deformation and a state in which the one of the first shaft sections causes the second deformation and the other first shaft section causes the first deformation.

11. The optical scanner according to claim 9, wherein the movable section is vibrated in the thickness direction of the movable section by making the displacement providing section alternately repeat a state in which the first shaft sections of the link sections cause the first deformation and a state in which the first shaft sections of the link sections cause the second deformation.

12. The optical scanner according to claim 1, wherein a pair of displacement providing sections is provided for the two link sections, and
each displacement providing section has a permanent magnet provided in the turnable drive section and a coil producing a magnetic field acting on the permanent magnet.

13. The optical scanner according to claim 12, wherein in each displacement providing section, the permanent magnet is provided in such a way that both poles face each other in the thickness direction of the movable section, and the coil is provided in such a way as to produce a magnetic field in the X-axis direction.

14. The optical scanner according to claim 13, wherein in each displacement providing section, the permanent magnet is provided so as to penetrate the turnable drive section.

15. An optical scanner comprising:
a movable section including a light reflecting section having light reflectivity;
a supporting section supporting the movable section;
two link sections provided on both sides of the movable section and connecting the movable section and the supporting section; and
a displacement providing section displacing the movable section,
wherein each link section has a drive section which is turnable with respect to the supporting section and a shaft section connecting the drive section and the movable section,
the shaft section of each link section can bend in a thickness direction of the movable section in a midpoint of the shaft section in a longitudinal direction, and
the movable section is displaced by making the displacement providing section turn the drive section of each link section and bend the shaft section by the turning,
when two axes which are at right angles to one another in a plan view of the movable section are an X axis and a Y axis,
each of the two link sections has the drive section placed so as to be away from the movable section in an X-axis direction, a first shaft section which is the shaft section connecting the movable section and the drive section and extending in the X-axis direction, and a second shaft section connecting the drive section and the supporting section and extending in a Y-axis direction, and
the first shaft section is bent by making the displacement providing section turn the drive section about the Y axis while torsionally deforming the second shaft section.

16. An image forming apparatus, comprising:
a light source; and
an optical scanner scanning a light from the light source, wherein
the optical scanner includes
a light reflecting section having light reflectivity,
a movable section which includes the light reflecting section and can be displaced,
two link sections connected to positions of ends of the movable section, the positions facing each other;
a supporting section supporting the link sections; and
a displacement providing section turning the two link sections, and
each link section includes:
   a turnable drive section, and
   a shaft section connecting the movable section and the turnable drive section and bending in a thickness direction of the movable section by turning of the turnable drive section, wherein when two axes which are at right angles to one another in a plan view of the movable section are an X axis and a Y axis,
each of the two link sections has the turnable drive section placed so as to be away from the movable section in an X-axis direction, a first shaft section which is the shaft section connecting the movable section and the turnable drive section and extending in the X-axis direction, and a second shaft section connecting the turnable drive section and the supporting section and extending in a Y-axis direction, and
the first shaft section is bent by making the displacement providing section turn the turnable drive section about the Y axis while torsionally deforming the second shaft section.

\* \* \* \* \*